Aug. 3, 1943.   M. E. NORDBERG   2,326,059
GLASS HAVING AN EXPANSION LOWER THAN THAT OF SILICA
Filed April 22, 1939
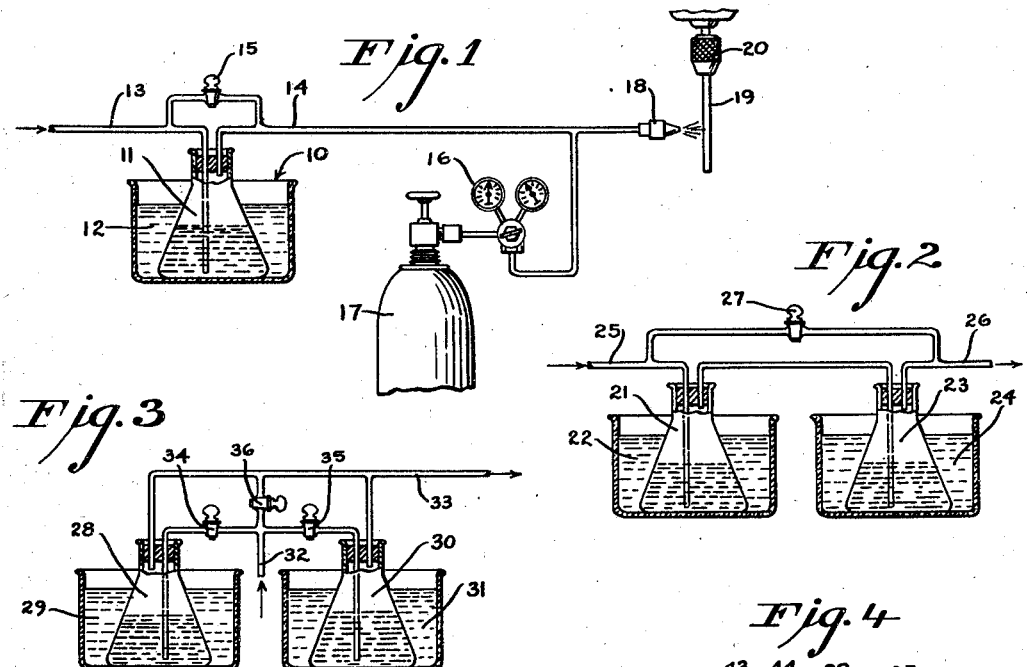
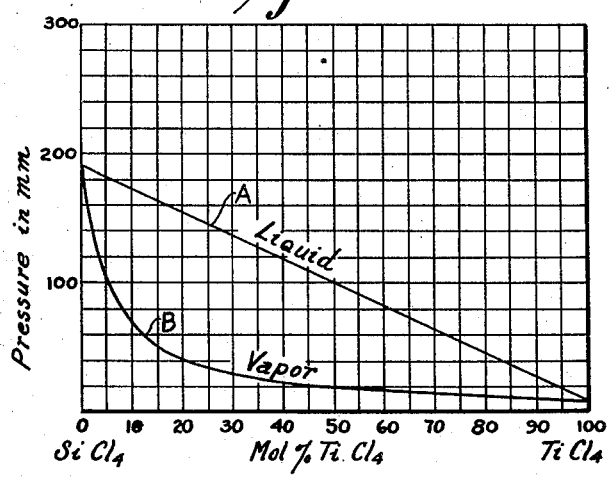
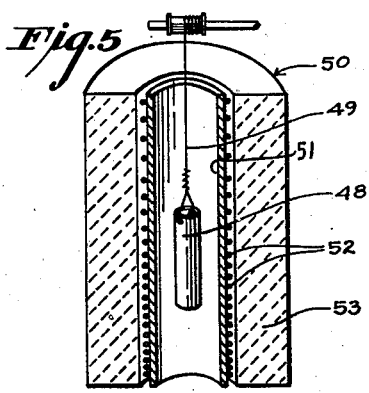
INVENTOR.
MARTIN E. NORDBERG
BY
ATTORNEY.

Patented Aug. 3, 1943

2,326,059

UNITED STATES PATENT OFFICE 2,326,059

GLASS HAVING AN EXPANSION LOWER THAN THAT OF SILICA

Martin E. Nordberg, Corning, N. Y., assignor to Corning Glass Works, Corning, N. Y., a corporation of New York Application April 22, 1939, Serial No. 269,497

3 Claims. (Cl. 106—52)

This invention relates to glasses having low expansion coefficients and high silica contents and has for its primary object to produce a glass having a coefficient of expansion less than that of pure fused silica.

Another object is to produce a glass having an expansion coefficient which is substantially zero in the temperature range from 0° C. to 300° C., that is, a glass which will not expand when heated in this range.

A further object is to produce an opal glass having the above described desirable properties.

With the above and other objects in view, the invention consists in the glass and the method of making it, to be hereinafter more fully described. More specifically, the invention comprises a glass containing from 89% to 95% of silica and over 5% but not over 11% of titanium oxide hereinafter called titania.

The invention further comprises the method which includes vaporizing the tetrachlorides of silicon and titanium into the gas stream of an oxy-gas burner, depositing the resultant mixture of oxides to make a preform, vitrifying the preform at about 1500° C. to make an opal glass thereof and firing the opal preform at a higher temperature to cause it to become transparent.

I have discovered that under proper conditions, to be hereinafter more fully set forth and described, titania and silica in a certain range of proportions can be combined to form a series of glasses which are transparent or opal, as desired, and which have very low expansion coefficients. With titania contents between about 5% and 11% the expansion coefficients of the resulting glasses are substantially less than that of silica, which possesses the lowest expansion coefficient of any substance heretofore known. When the titania content is increased to about 9%, the expansion coefficient becomes substantially zero insofar as can be determined by the usual methods, that is, a glass of this composition does not appreciably expand nor contract when heated or cooled in the temperature range 0° C. to 300° C. When the titania content is increased beyond about 9%, the expansion coefficient increases rapidly and with a titania content greater than about 11% the expansion coefficient is too large for my purpose and the glass is otherwise unsatisfactory.

The following compositions which I have prepared together with their expansion coefficients as measured will illustrate my invention:

|  | I | II | III | IV | V |
|---|---|---|---|---|---|
| $SiO_2$ | 94.7 | 93.8 | 91.6 | 90.3 | 89.6 |
| $TiO_2$ | 5.3 | 6.2 | 8.4 | 9.7 | 10.4 |
| $Al_2O_3$ |  |  |  |  |  |
| $ZrO_2$ |  |  |  |  |  |
| $B_2O_3$ |  |  |  |  |  |
| Exp./$10^{-7}$ | 2.1 | 1.75 | .1 | −.7 | .6 |

It will be noted that the expansion coefficients of the above glasses are below that of fused silica, which is generally accepted to be about $5.5 \times 10^{-7}$. Glasses III and IV have an expansion coefficient which is substantially zero.

In the above recited range of compositions small amounts of titania or silica may be replaced by aluminum oxide or zirconium oxide in an amount not to exceed about 5% without causing substantial change in the valuable properties of the glasses.

The glasses of my invention are very refractory and require such high temperatures for melting them that the usual glass melting methods do not produce satisfactory results. They may, however, be prepared by the method hereinafter described in connection with the accompanying drawing in which:

Fig. 1 is a side view partly in section of an apparatus for forming and depositing a mixture of oxides suitable for making a glass in accordance with my invention;

Fig. 2 is a side view partly in section of a modified form of apparatus for generating mixed vapors of silicon and titanium tetrachlorides;

Fig. 3 is a side view partly in section of another alternative form of generator for the vapors of silicon and titanium tetrachlorides;

Fig. 4 is a side view partly in section of an apparatus for generating the vapor of aluminum chloride or zirconium chloride;

Fig. 5 is a perspective sectional view of a furnace showing a preformed mixture of oxides being vitrified; and Fig. 6 is a graph showing the relationship between calculated vapor pressure and molecular percentage of liquid mixtures of silicon tetrachloride and titanium tetrachloride at 20° C. and the vapors in equilibrium therewith.

In Fig. 1 a vapor generator generally designated 10 comprises a flask 11 containing a liquid mixture of silicon tetrachloride and titanium tetrachloride which is supported in a constant temperature bath 12 and is provided with a tube 13 for introducing a combustible gas and a delivery tube 14. A by-pass valve 15 connects the tubes 13 and 14. The tube 14 is further connected through a reducing valve 16 with an oxygen tank 17 and with a burner tip 18. In front of the burner tip 18 a tapered mandrel 19 composed preferably of nickel or other non-scaling refractory metal is held by a rotatable chuck 20 which is actuated by an ordinary drill press (not shown) so that the mandrel 19, while rotating, may be reciprocated through the flame in a direction parallel with the axis of the mandrel.

In Fig. 2 a flask 21 supported in a heating bath 22 and a flask 23 supported in a heating bath 24 are joined in series with a gas line 25 and a delivery tube 26. A by-pass valve 27 connects the line 25 and the tube 26.

In Fig. 3 a flask 28 supported in a heating bath 29 and a flask 30 supported in a heating bath 31 are joined in parallel relation with a gas line 32 and a delivery tube 33 and are provided with valves 34 and 35. A by-pass valve 36 connects the line 32 and the tube 33.

In Fig. 4 a vapor generator generally designated 37 comprises a cylindrical metal barrel 38, within which are disposed a refractory boat 39 and baffles 40. The barrel 38 is provided at one end with a burner tip 41 and at the other end with a removable cover plate 42 and is surrounded by a heating element 43 and refractory insulation 44. Through the plate 42 a metal tube 45 containing a thermometer 46 projects into the barrel 38 and is closed at its inwardly projecting end. A tube 47 for introducing combustible gas and vapors extends through the plate 42 and communicates with the interior of the barrel 38.

In Fig. 5 a preform 48 is suspended from a platinum wire 49 within an electric furnace generally designated 50 and comprising a tubular core 51 provided with a platinum heating element 52 and thermal insulation 53.

For the preparation of my glasses by means of the above described apparatus a combustible gas, such as natural gas, is introduced through the tube 13 and ignited at the burner tip 18. By means of the reducing valve 16 a controlled amount of oxygen is admitted to the burner from the tank 17 to produce a high temperature flame. A mixture of the vapors of silicon and titanium tetrachlorides is then introduced into the gas stream by closing the by-pass valve 15 and on passing through the flame the vapors are decomposed by the heat and the combustion products to form an anhydrous mixture of the oxides of silicon and titanium. The oxide mixture carried by the flame is deposited on the rotating mandrel 19 where it builds up a tubular, coherent, amorphous deposit or preform. After the preform has attained a suitable thickness, say 2 mm. or more, it is allowed to cool and is removed from the mandrel after which the preform is vitrified by heating it to 1500° C. or higher, as will later be described.

The composition of the preform may be predetermined and is controlled preferably by using in the generator 10 a liquid mixture of silicon tetrachloride and titanium tetrachloride in the proportions which will evolve at a given temperature a mixture of the vapors of the salts which is equivalent to the oxide composition of the desired glass. The proper proportions of the liquid mixture may be determined most conveniently by means of curves or graphs representing the relationship between vapor pressure and composition at the chosen temperature. Using the known vapor pressures of pure silicon and titanium tetrachlorides and assuming that the mixed liquids and their vapor pressures conform to the laws for ideal solutions and gases, the curves in Fig. 6 were constructed as an example and can be used to show such a relationship for these substances at the arbitrarily selected temperature of 20° C. Curve A shows how the vapor pressure of a liquid mixture of these substances at 20° C. varies with the molecular composition of the mixture and curve B shows the molecular compositions of the various vapor mixtures which are in equilibrium with these liquid mixtures.

In determining the proportions of the materials to be used, the percentage of silica and titania in the desired glass are converted by calculation to the equivalent molecular percentages of silicon tetrachloride and titanium tetrachloride. This represents the composition of the vapor mixture which must be employed. From curve B the vapor pressure of the corresponding liquid mixture is ascertained and from curve A the molecular proportions of this liquid mixture is found. By conversion of the latter figures to the weight percentage basis the composition of the required liquid mixture in percent by weight is determined.

For example, in case it is desired to produce a glass having the percentage composition 90% $SiO_2$ and 10% $TiO_2$, the equivalent molecular percentages of the chlorides corresponding thereto is 92.2 mol % $SiCl_4$ and 7.8 mol % $TiCl_4$. From curve B it is found that the vapor pressure at 20° C. of a liquid mixture the vapor of which has this composition, is about 90 mm. and from curve A it is seen that the composition of this liquid mixture is 62 mol % $TiCl_4$ and 38 mol % $SiCl_4$ which is equivalent to 64.5% $TiCl_4$ and 35.5% $SiCl_4$ by weight. In a similar manner the compositions of all liquid mixtures of silicon chloride and titanium chloride which can be used for the production of my glasses may be determined.

Since the composition of the vapor removed will be different than the composition of the liquid, the composition of the latter will gradually change as the vapor is used. If the initial volume of the liquid mixture is sufficiently large, this change will be inappreciable for a substantial length of time, but if the initial volume is small the change will be relatively rapid. In order to maintain the proper liquid composition, it is necessary to replenish the liquid mixture by the constant addition of fresh liquid having the composition of the vapor mixture which is being withdrawn and equivalent thereto in amount. Means for making such addition can readily be devised by one skilled in the art.

If desired, the liquid silicon tetrachloride and titanium tetrachloride may be vaporized from separate containers and the vapors thereafter mixed by introduction into the gas stream. For example, in lieu of the generator 10 there may be substituted the series generator shown in Fig. 2 or the parallel generator shown in Fig. 3.

In using the series generator, the silicon tetrachloride is placed in the flask 21 and the titanium tetrachloride is placed in the flask 23. The amount of vapor introduced into the gas stream is governed both by the amount of combustible gas passed through the liquids, which in turn is controlled by the by-pass valve 27, and by the temperatures of the liquids. The proportions of the two vapors is controlled by the relative temperatures of the two liquids as maintained by the heating baths 22 and 24, the temperature of the latter being always above the boiling point of silicon tetrachloride.

In using the parallel generator of Fig. 3 the silicon tetrachloride and titanium tetrachloride are placed individually in the flasks 28 and 30 and the amount of combustible gas passed through each flask is controlled by the valves 34 and 35 respectively. In this case the relative proportions of the two vapors is controlled not only by the temperatures at which the two liquids are maintained by the heating baths 29 and 31, but also by the relative amounts of gas passed through each flask. The same result may be obtained by using high pressure containers such as steel bottles in lieu of the two flasks and maintaining each at a sufficiently high temperature to generate therein a high vapor pressure, the amount of vapor introduced into the gas stream from each container being controlled and measured by means of valves and flowmeters.

If, as hereinbefore mentioned, it is desired to introduce small amounts of other oxides, such as aluminum oxide or zirconium oxide, into the silica-titania composition of the preform, this may readily be accomplished by additionally introducing into the gas stream the vapors of their chlorides. For this purpose the vapor generator 37, shown in Fig. 4, is substituted in lieu of the burner tip 18 in Fig. 1. Aluminum chloride or zirconium chloride is placed in the refractory boat 39 and heated sufficiently by means of the heating element 43 to cause vaporization of the salt at a desired rate. The rate of vaporization is controlled by controlling the temperature of the barrel 11 through the power input of the electrical heating element 43.

The method of making glass by decomposing mixtures of gaseous glass-forming compounds in a high temperature flame and vitrifying the resultant oxide mixtures is broadly claimed in another application Serial Number 269,496 filed jointly by me and Robert H. Dalton of even date herewith.

My glasses containing silica and titania can be made either clear and transparent or opaque, that is, opal, depending upon the manner in which the preform is vitrified. If vitrification is accomplished at about 1500° C., the resulting glass is a dense opal but, if the opal glass is subsequently heated at about 1600° C. or above, the opacity disappears and the glass becomes clear and transparent. Likewise, if the amorphous preform is heated directly at a temperature of about 1600° C. or above, the resulting glass is clear and transparent. My glasses, when once they have been made clear, either by a preliminary opalization at about 1500° C. followed by a subsequent heating at higher temperature or by a direct heating at the higher temperature, cannot again be converted to a good opal glass by reheating at 1500° C. This phenomenon is characteristic of my new compositions and is not exhibited by any prior glasses insofar as I am aware.

On account of an appreciable shrinkage of the preform on firing with a consequent possibility of cracking if heated too rapidly and since a reducing atmosphere is objectionable in firing, vitrification is best accomplished by introducing the preform slowly into an electric furnace or gas fired muffle with an oxidizing atmosphere. For example, as shown in Fig. 5, the preform 48 is suspended by the platinum wire 49 in such a manner that it can be lowered gradually into the electric furnace 50 which in its hottest region is maintained at a temperature of about 1500° C. The rate at which the preform is lowered should be slow enough to allow the air in the pores thereof to be expelled as the oxides fuse together. About fifteen minutes should suffice to pass a preform six inches long through the furnace. Under these conditions the resulting glass will be a dense opal. On account of its extremely low expansion the preform when once it has been vitrified can be heated or cooled as rapidly as desired. By a subsequent heating in a high temperature flame or in the electric furnace maintained at a temperature of 1600° C. or above, the opacity of the glass disappears and it becomes very clear and transparent and possesses a high lustre. If desired, the glass can be made clear on the first heating by using a temperature of 1600° C. or above.

The glass thus made can be reworked in a high temperature flame and molded and formed into desired articles in the manner known to those who are skilled in such manipulations. Articles which are to be opal must be preformed as above described because they cannot be subsequently heated to softness without losing their opacity.

I claim:

1. A glass which consists of 89%–95% of silica and over 5% but not over 11% of titanium oxide and which has a coefficient of expansion less than that of silica.

2. A glass which consists of silica and titanium oxide, the titania being over 5% but not over 11% the glass being substantially transparent.

3. A glass which consists of silica and titanium oxide, the titania being over 5% but not over 11%, the glass being opal.

MARTIN E. NORDBERG.